(12) United States Patent
Geertgens et al.

(10) Patent No.: US 11,217,886 B2
(45) Date of Patent: Jan. 4, 2022

(54) CABLE MANAGEMENT FLOOR SYSTEM

(71) Applicant: FreeAxez LLC, Delran, NJ (US)

(72) Inventors: Earl Geertgens, Edgewater Park, NJ (US); Tama Geertgens, Edgewater Park, NJ (US)

(73) Assignee: FreeAxez LLC, Delran, NJ (US)

( * ) Notice: Subject to any disclaimer, the term of this patent is extended or adjusted under 35 U.S.C. 154(b) by 0 days.

(21) Appl. No.: 16/057,893

(22) Filed: Aug. 8, 2018

(65) Prior Publication Data
US 2019/0074583 A1 Mar. 7, 2019

Related U.S. Application Data

(63) Continuation of application No. 15/695,462, filed on Sep. 5, 2017, now Pat. No. 10,236,570.

(51) Int. Cl.
| | | |
|---|---|---|
| *E04F 15/024* | (2006.01) | |
| *E04B 5/48* | (2006.01) | |
| *H01Q 1/46* | (2006.01) | |
| *H01Q 1/00* | (2006.01) | |
| *H04N 5/225* | (2006.01) | |
| *H02G 3/18* | (2006.01) | |
| *E04F 15/02* | (2006.01) | |

(52) U.S. Cl.
CPC .......... *H01Q 1/46* (2013.01); *E04F 15/02411* (2013.01); *E04F 15/02417* (2013.01); *H01Q 1/007* (2013.01); *H02G 3/185* (2013.01); *H04N 5/2251* (2013.01); *E04F 15/02429* (2013.01); *E04F 2015/02105* (2013.01)

(58) Field of Classification Search
CPC ...... E04F 15/02429; E04F 2015/02105; E04F 15/02452; E04F 15/02458; E04F 15/02405; E04F 15/024; E04F 15/02411; E04F 15/02417; E04F 15/02494; H04N 5/2251; H01Q 1/007; H01Q 1/46; H02G 3/185; H02G 3/22; H02G 3/283; H02G 3/285; H02G 3/385; H02G 3/0493; H02G 3/28; E04B 5/48; E04B 5/43
USPC ....................................................... 52/126.1
See application file for complete search history.

(56) References Cited

U.S. PATENT DOCUMENTS

| | | | |
|---|---|---|---|
| 4,475,322 A | 10/1984 | Russo | |
| 4,773,196 A | 9/1988 | Yoshida et al. | |
| RE33,220 E * | 5/1990 | Collier | E04F 15/02452 174/490 |
| 4,990,804 A | 3/1991 | Naka | |
| 4,996,804 A * | 3/1991 | Naka | E04F 15/02452 52/126.1 |
| 5,031,369 A | 7/1991 | Kobayashi | |
| 5,057,647 A | 10/1991 | Bogden | |

(Continued)

*Primary Examiner* — Brian E Glessner
*Assistant Examiner* — James J Buckle, Jr.
(74) *Attorney, Agent, or Firm* — Ballard Spahr LLP (57) ABSTRACT

A floor system uses interlocking elements to form a surface raised above a floor surface for the distribution of electrical power and data throughout the floor of a building. The base units of the interlocking elements define channels which receive cables for data and power transmission. Channel and corner covers overlie the channels and interlock with the base units to form the raised surface. Fused electrical feed modules within channels provide electrical power to bus bars which distribute the power to fused terminal boxes and radio frequency sensors and beacons mounted in the base units.

6 Claims, 7 Drawing Sheets

(56) References Cited

U.S. PATENT DOCUMENTS

| | | | | |
|---|---|---|---|---|
| 5,178,555 A | * | 1/1993 | Kilpatrick | H01R 25/164 248/222.41 |
| 5,340,326 A | * | 8/1994 | LeMaster | H01R 25/00 439/207 |
| 5,434,355 A | | 7/1995 | Sho | |
| 5,468,908 A | * | 11/1995 | Arthur | H02G 3/185 174/482 |
| 5,477,649 A | * | 12/1995 | Bessert | H02G 3/285 174/486 |
| 5,628,157 A | | 5/1997 | Chen | |
| 5,630,300 A | | 5/1997 | Chen | |
| 5,675,949 A | | 10/1997 | Forslund | |
| 5,697,193 A | | 12/1997 | Forslund, III | |
| 5,768,840 A | | 6/1998 | Feldpausch | |
| 5,794,392 A | | 8/1998 | Forslund, III | |
| 5,901,515 A | | 5/1999 | Chen | |
| 5,904,015 A | | 5/1999 | Chen | |
| 5,943,833 A | | 8/1999 | Faldpausch | |
| 5,996,294 A | | 12/1999 | Forslund, III | |
| 6,202,374 B1 | * | 3/2001 | Cooper | E04B 5/48 52/126.3 |
| 6,293,062 B1 | | 9/2001 | Chen | |
| 6,311,440 B1 | | 11/2001 | Feldpausch | |
| 6,397,539 B1 | | 6/2002 | Kimura | |
| 6,430,882 B1 | | 8/2002 | Feldpausch | |
| 6,637,161 B1 | | 10/2003 | Buchalter | |
| 6,694,689 B1 | | 2/2004 | Scott | |
| 6,748,707 B1 | | 6/2004 | Buchalter | |
| RE39,097 E | * | 5/2006 | Schilham | E04F 15/02452 52/220.1 |
| 7,183,504 B2 | | 2/2007 | Byrne | |
| 7,878,845 B2 | * | 2/2011 | Byrne | H02G 3/385 174/486 |
| 9,083,170 B2 | | 7/2015 | Cudak | |
| 9,088,145 B2 | | 7/2015 | Brooks | |
| 9,136,682 B2 | | 9/2015 | Cudak | |
| 9,879,434 B2 | | 1/2018 | Boyd | |
| 10,236,570 B1 | | 3/2019 | Geertgens et al. | |
| 2001/0002523 A1 | * | 6/2001 | Chen | E04F 15/02429 52/263 |
| 2001/0034987 A1 | * | 11/2001 | Cooper | E04B 5/48 52/220.8 |
| 2002/0183979 A1 | * | 12/2002 | Wildman | G06K 7/0008 702/188 |
| 2004/0222896 A1 | * | 11/2004 | Power | G07C 9/00103 340/687 |
| 2005/0035862 A1 | * | 2/2005 | Wildman | A61B 5/1113 340/573.1 |
| 2015/0365630 A1 | | 12/2015 | Rodriguez | |
| 2016/0079721 A1 | * | 3/2016 | Jones | H01R 13/5202 439/587 |
| 2016/0118707 A1 | | 4/2016 | Burrell | |
| 2017/0229770 A1 | | 8/2017 | Lai | |
| 2019/0260193 A1 | * | 8/2019 | Schneider | H01R 13/447 |

* cited by examiner

CABLE MANAGEMENT FLOOR SYSTEM

CROSS REFERENCE TO RELATED APPLICATIONS

This application is a continuation of U.S. application Ser. No. 15/695,462, filed Sep. 5, 2017 and hereby incorporated by reference.

FIELD OF THE INVENTION

The invention concerns a system for distributing electrical power and data cables as well as gas and water lines throughout an area such as a floor of a building.

BACKGROUND

Raised floor systems find widespread use in office buildings, in particular, IT data centers, server rooms, communication centers and other areas through which networks of electrical service lines, communication lines and data lines need to be routed. Raised floor systems provide a void space above the building floor to conveniently distribute electrical wiring and cabling while maintaining the network hidden from view.

Prior art raised floor systems, comprising, for example, a gridded metal framework which supports removable floor panels, suffer various disadvantages. Structural defects, for example, panels which are not stable, but rock when subjected to loading, or which develop gaps between panels, present a hazard to building occupants. Prior art raised floor systems have been found to increase the peak cooling load on air conditioning systems and constitute a separate air space which is subject to fire backdraft and require a dedicated fire suppression system against under floor fires. Prior art raised floor systems are furthermore difficult to reconfigure as demands change and are not readily broken down for reassembly at another location. There is clearly an opportunity for improvements to flooring systems.

SUMMARY

The invention concerns a floor system positionable on a floor surface. In one example embodiment the system comprises at least one distribution plate comprising a distribution plate surface supported in spaced relation above the floor surface on a plurality of first support elements. A plurality of base units are positionable in spaced relation to one another on the floor surface thereby defining a plurality of channels therebetween. Each of the base units comprises a base plate supported in spaced relation above the floor surface on a plurality of second support elements. At least a portion of the base units are positioned adjacent to the at least one distribution plate. A plurality of channel covers are positioned overlying the plurality of channels. The channel covers are supported by adjacent ones of the base units. A plurality of corner covers overlie a space formed where at least two of the channels intersect one another. The corner covers are supported by adjacent ones of the base units. The at least one distribution plate has a greater surface area than any one of the base units, the channel covers and the corner covers.

In an example embodiment at least one of the first support elements comprises a pin engaged with the at least one distribution plate. By way of further example, each one of the first support elements comprises a pin engaged with the at least one distribution plate. In an example embodiment, the pin comprises a nipple extending from one end thereof, the nipple engaging a hole in the at least one distribution plate. In a particular example, the nipple is threaded and the hole is threaded. Further by way of example, the pin comprises a threaded hole positioned at one end, the threaded hole receiving a threaded fastener extending through a hole in the at least one distribution plate for attaching the pin thereto.

An example system may further comprise a foundation plate attached to the plurality of first support elements in spaced relation to the distribution plate. The foundation plate is positionable on the floor surface. Further by way of example, at least one of the first support elements comprises a pin attached to the foundation plate. In another example, each one of the first support elements comprises a pin attached to the foundation plate. In an example embodiment the pin comprises a threaded hole positioned at one end, the threaded hole receiving a threaded fastener extending through a hole in the foundation plate for attaching the pin thereto.

In an example embodiment the system further comprises at least one feed module positioned in at least one of the channels. The at least one feed module comprises a cable connectable to a source of electrical power, a first set of contacts electrically connected to the cable, a second set of contacts electrically connected to the first set of contacts and a container enclosing the first set of contacts. The container is sized to fit within the at least one channel.

A further example system comprises at least one bus bar positioned in at least one of the channels. The at least one bus bar comprises at least two elongate electrical conductors, at least a first and a second set of contacts electrically connected to the elongate electrical conductors and a container enclosing the elongate electrical conductors and the first and second sets of contacts. The container is sized to fit within the at least one channel.

An example system may further comprise at least one terminal box positioned within one of the base units. The at least one terminal box comprises a container, a first set of electrical contacts positioned within the container, a second set of electrical contacts and an electrical conductor connecting the second set of electrical contacts to the first set of electrical contacts.

An example floor system may also comprise at least one terminal box associated with one of the base units. The at least one terminal box comprises a container, a first set of electrical contacts positioned within the container, a second set of electrical contacts and an electrical conductor connecting the second set of electrical contacts to the first set of electrical contacts.

An example floor system may further comprise at least one radio frequency transmitter positioned within one of the base units, one of the channel covers or one of the corner covers.

An example floor system may further comprise a cable management boot for supporting a plurality of cables. In an example embodiment, the boot comprises a duct having an entrance opening and an exit opening oriented transversely to the entrance opening. The duct comprises a back wall having a first edge positioned at the entrance opening and a second edge positioned at the exit opening. The back wall defines a path between the entrance opening and the exit opening. A front wall is positioned in spaced relation to the back wall. The front wall has a first edge positioned at the entrance opening and cooperating with said first edge of said back wall to define said entrance opening the entrance opening. The front wall further comprises a second edge positioned in spaced relation to the second edge of the back wall. The second edges of the front and back walls define the exit opening. In an example system the boot may be positioned adjacent to the at least one distribution plate.

The invention further encompasses a floor system positionable on a floor surface. In an example embodiment the system comprises a plurality of base units positionable in spaced relation to one another on the floor surface thereby defining a plurality of channels therebetween. Each base unit comprises a base plate supported in spaced relation above the floor surface on a plurality of support elements. A plurality of channel covers are positioned overlying the plurality of channels. The channel covers are supported by adjacent ones of the base units. A plurality of corner covers overlie a space formed where at least two of the channels intersect one another. The corner covers are supported by adjacent ones of the base units. For at least one of the base units, the support elements comprise a plurality of pins engaged with the base plate and projecting transversely thereto.

In an example embodiment the pins are distributed in spaced apart relation across the base plate. Further by way of example, at least one of the pins comprises a nipple extending from one end thereof, the nipple engaging a hole in the base plate. In an example embodiment the nipple is threaded and the hole is threaded. Further by way of example, at least one of the pins comprises a threaded hole positioned at one end thereof. The threaded hole receives a threaded fastener extending through a hole in the base plate for attaching the pin thereto.

Another example embodiment further comprises a foundation plate attached to the plurality of pins in spaced relation to the base plate. The foundation plate is positionable on the floor surface. By way of example, at least one of the pins comprises a threaded hole positioned at one end, the threaded hole receiving a threaded fastener extending through a hole in the foundation plate for attaching the at least one pin thereto.

An example embodiment may further comprise an under plate underlying the base plate. The under plate is larger than the base plate. An electrically insulating substrate is positioned between the underplate and the base plate. By way of example, at least one feed module is positioned in at least one of the channels. The at least one feed module comprises a cable connectable to a source of electrical power, a first set of contacts electrically connected to the cable, a second set of contacts electrically connected to the first set of contacts and a container enclosing the first set of contacts, the container being sized to fit within the at least one channel.

In a further example embodiment, at least one bus bar is positioned in at least one of the channels. The at least one bus bar comprises at least two elongate electrical conductors, at least a first and a second set of contacts electrically connected to the elongate electrical conductors and a container enclosing the elongate electrical conductors and the first and second sets of contacts. The container is sized to fit within the at least one channel.

Further by way of example, at least one terminal box is positioned within one of the base units. The at least one terminal box comprises a container, a first set of electrical contacts positioned within the container, a second set of electrical contacts and an electrical conductor connecting the second set of electrical contacts to the first set of electrical contacts.

In another example embodiment at least one terminal box is associated with one of the base units. The at least one terminal box comprises a container, a first set of electrical contacts positioned within the container, a second set of electrical contacts and an electrical conductor connecting the second set of electrical contacts to the first set of electrical contacts.

By way of example, the floor system may further comprise at least one radio frequency transmitter positioned within one of the base units. Further by way of example, at least one distribution plate comprising a distribution plate surface is supported in spaced relation above the floor surface on a plurality of first support elements. The at least one distribution plate has a greater surface area than any one of the base units, the channel covers and the corner covers.

The invention further encompasses a cable management boot for supporting a plurality of cables. In an example embodiment the boot comprises a duct having an entrance opening and an exit opening oriented transversely to the entrance opening. The duct in this example comprises a back wall having a first edge positioned at the entrance opening and a second edge positioned at the exit opening. The back wall defines a path between the entrance opening and the exit opening. A front wall is positioned in spaced relation to the back wall. The front wall has a first edge positioned at the entrance opening and, with the first edge of the back wall, thereby defines the entrance opening. The front wall further comprises a second edge positioned in spaced relation to the second edge of the back wall. The second edges of the front and back walls define the exit opening.

In an example embodiment, the boot is positioned adjacent to the at least one distribution plate.

The invention also encompasses a floor system positionable on a floor surface. In an example embodiment the system comprises a plurality of base units positionable in spaced relation to one another on the floor surface thereby defining a plurality of channels therebetween. Each base unit comprises a base plate supported in spaced relation above the floor surface on a plurality of support elements. A plurality of channel covers are positioned overlying the plurality of channels. The channel covers are supported by adjacent ones of the base units. A plurality of corner covers overlie a space formed where at least two of the channels intersect one another. The corner covers are supported by adjacent ones of the base units. At least one feed module positioned in at least one of the channels. By way of example the at least one feed module comprises a cable connectable to a source of electrical power, a first set of contacts electrically connected to the cable, a second set of contacts electrically connected to the first set of contacts and a container enclosing the first set of contacts. The container is sized to fit within the at least one channel.

In a further example of a floor system positionable on a floor surface, the system comprises a plurality of base units positionable in spaced relation to one another on the floor surface thereby defining a plurality of channels therebetween. Each base unit comprises a base plate supported in spaced relation above the floor surface on a plurality of support elements. A plurality of channel covers are positioned overlying the plurality of channels. The channel covers are supported by adjacent ones of the base units. A plurality of corner covers overlie a space formed where at least two of the channels intersect one another. The corner covers are supported by adjacent ones of the base units. At least one bus bar is positioned in at least one of the channels. The at least one bus bar comprises at least two elongate electrical conductor, at least a first and a second set of contacts electrically connected to the elongate electrical conductors and a container enclosing the elongate electrical conductors and the first and second sets of contacts. The container is sized to fit within the at least one channel.

Another example floor system positionable on a floor surface comprises a plurality of base units positionable in spaced relation to one another on the floor surface thereby defining a plurality of channels therebetween. Each base unit comprises a base plate supported in spaced relation above the floor surface on a plurality of support elements. A plurality of channel covers are positioned overlying the plurality of channels. The channel covers are supported by adjacent ones of the base units. A plurality of corner covers overlying a space formed where at least two of the channels intersect one another. The corner covers are supported by adjacent ones of the base units. At least one terminal box is positioned within one of the base units. By way of example the at least one terminal box comprises a container, a first set of electrical contacts positioned within the container, a second set of electrical contacts and an electrical conductor connecting the second set of electrical contacts to the first set of electrical contacts.

In a further example of a floor system positionable on a floor surface, the system comprises a plurality of base units positionable in spaced relation to one another on the floor surface thereby defining a plurality of channels therebetween. Each base unit comprising a base plate supported in spaced relation above the floor surface on a plurality of support elements. A plurality of channel covers are positioned overlying the plurality of channels. The channel covers are supported by adjacent ones of the base units. A plurality of corner covers overlie a space formed where at least two of the channels intersect one another. The corner covers are supported by adjacent ones of the base units. At least one terminal box is associated with one of the base units. The at least one terminal box comprises a container, a first set of electrical contacts positioned within the container, a second set of electrical contacts and an electrical conductor connecting the second set of electrical contacts to the first set of electrical contacts.

Further by way of example, a floor system positionable on a floor surface comprises a plurality of base units positionable in spaced relation to one another on the floor surface thereby defining a plurality of channels therebetween. Each base unit comprising a base plate supported in spaced relation above the floor surface on a plurality of support elements. A plurality of channel covers are positioned overlying the plurality of channels. The channel covers are supported by adjacent ones of the base units. A plurality of corner covers overlie a space formed where at least two of the channels intersect one another. The corner covers are supported by adjacent ones of the base units. At least one radio frequency transmitter is positioned within one of the base units. In an example embodiment, the radio frequency transmitter comprises a motion sensor. In another example embodiment, the radio frequency transmitter comprises an identification beacon. Further by way of example, the radio frequency transmitter comprises a combination motion sensor and identification beacon.

The invention further encompasses a cable management boot for supporting a plurality of cables. In an example embodiment the boot comprises a duct having an entrance opening and an exit opening oriented transversely to the entrance opening. The duct comprises a back wall having a first edge positioned at the entrance opening and a second edge positioned at the exit opening. The back wall defines a path between the entrance opening and the exit opening. A front wall is positioned in spaced relation to the back wall. The front wall has a first edge positioned at the entrance opening and, with the first edge of the back wall, thereby defines the entrance opening. The front wall further comprises a second edge positioned in spaced relation to the second edge of the back wall. The second edges of the front and back walls define the exit opening.

By way of example, the back wall comprises a concave surface facing the front wall. In a further example, the front wall comprises a convex surface facing the back wall. In an example embodiment the boot may further comprise a first sidewall extending between the front and back walls and a second sidewall extending between the front and back walls. The second sidewall is positioned in spaced relation to the first side wall. In an example embodiment the first and second sidewalls are positioned at opposite ends of the front and back walls. An example boot may further comprise at least a first flange attached to the first sidewall. The first flange extends outwardly from the first sidewall. At least a second flange may be attached to the second sidewall. The second flange extends outwardly from the second sidewall. In an example embodiment the first and second flanges are positioned adjacent to the front wall.

DETAILED DESCRIPTION

Figure 1:
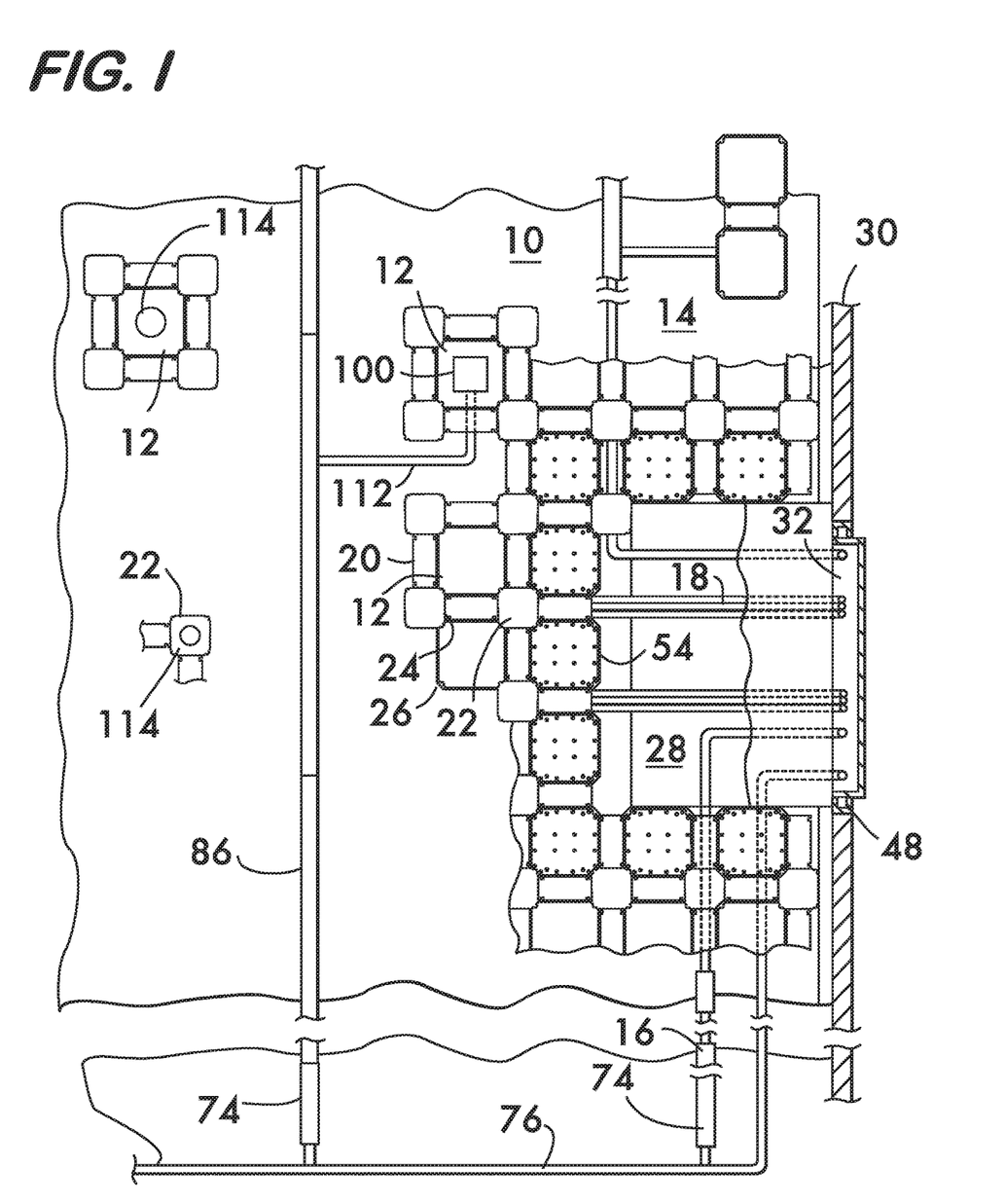
FIG. 1 is a plan view of an example floor system according to the invention.

FIG. 1 shows, in plan form, an example floor system 10 according to the invention. In this example embodiment, system 10 comprises a plurality of base units 12. The base units 12 are positioned in spaced relation to one another on a surface, such as the floor surface 14 of a building (not shown). The base units 12 are distributed equidistant from one another in an array and define a plurality of channels 16 therebetween. Channels 16 extend along floor surface 14 and form a grid. The channels 16 receive cables 18 and higher amperage electrical power carrying elements (described below) and distribute these cables and power elements as desired throughout the floor. The cables 18 (for example, wires, coaxial cable and/or optical fibers) may carry data between computer work stations and a server, or telephone communications, as well as standard AC power for appliances such as personal computers, lights, and other electrical equipment.

A plurality of channel covers 20 (see also FIG. 5), which are supported by and interlock with the base units 12, overlie the channels 16. In a practical design the channels may be on 15 inch centers. A plurality of corner covers 22 (see also FIG. 6) overlie the space 24 where two or more of the channels 16 intersect. The corner covers 22 interlock with and are supported by adjacent base units 12. Together the base units 12, channel covers 20 and corner covers 22 form a surface 26 raised above the building floor surface 14. In a practical design the surface 26 may be, for example, from about 1.6 inches to about 2.75 inches above the building floor surface 14. Surface 26 may be covered with carpet tiles or other modular floor coverings which permit ready access to the system 10 and allow repairs or modifications to the cable routing be effected easily without tools. Workstations, cubicles and offices are supported on the surface 26, and cables and power elements can be arranged in the channels 16 beneath the surface 26 as needed for any specific architectural design.

Some designs require a relatively large number of data cables and/or power lines to be brought onto a floor surface 14 at a specific point, for example, from a server cabinet. To handle such a dense convergence of cables and/or power lines it is advantageous to employ a distribution plate 28 (described in detail below). Distribution plate 28 is also useful when a large number of cables are brought down a wall and onto the floor surface 14. To guide the cables and power lines as they turn the corner from the wall 30 to the floor surface 14 it is advantageous to use a cable management boot 32 (described below).

Figures 2, 2A, 2B, 2C:
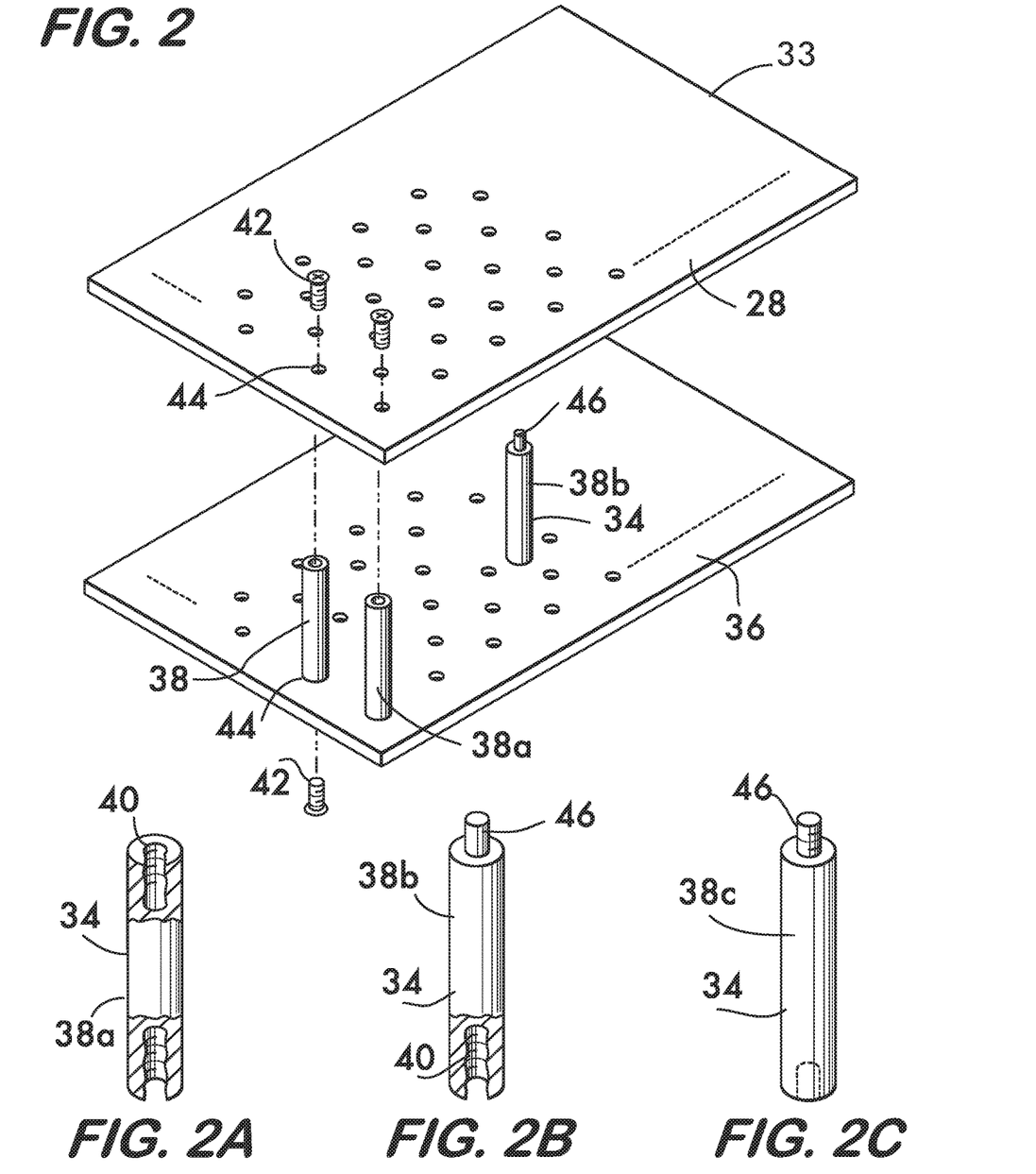
FIG. 2 is an exploded isometric view of an example structural component of the flooring system shown in FIG. 1.
FIGS. 2A, 2B and 2C are isometric views of example parts of the structural component shown in FIG. 2.

An example distribution plate 28 is shown in FIG. 2 and comprises a distribution plate surface 33. Plate 28 may be formed of metal, such as steel, or a polymer and is supported in spaced relation above the floor surface 14 on a plurality of support elements 34. Support elements 34 may contact floor surface 14 directly, or, as shown in this example, they may attach to a foundation plate 36 positionable on the floor surface 14. In a practical example, the distribution plate may be 63 inches long by 44 inches wide and have a thickness of 0.125 inches. Surface 33 of distribution plate 28 has a larger surface area than any of the channel covers 20, corner covers 22 and base units 20. Support elements 34 may be distributed over the distribution plate 28 on 4 inch centers to provide adequate support of the distribution plate while allowing sufficient free space between the support elements 34 to accommodate the convergence and or organization of a large number of cables 18 (see FIG. 1).

Example support elements 34 are shown in FIGS. 2A, 2B and 2C and comprise pins 38. FIG. 2A shows a pin 38a having threaded holes 40 at one or both ends. As shown in FIG. 2, threaded holes 40 in pins 38a receive threaded fasteners 42 which extend through holes 44 in the distribution plate 28 and the foundation plate 36 (when present) to retain the pins to the plates and the plates to one another in spaced relation. FIG. 2B shows another pin 38b, which has a threaded hole 40 at the end which engages the foundation plate 36, and a nipple 46 at the opposite end which engages the distribution plate 28. Fasteners 42 engage the threaded hole 40 and retain the pins 38b to the foundation plate 36, while nipples 46 engage holes 44 in the distribution plate 28. It is found advantageous to use both types of pins 38a and 38b to attach the distribution plate 28 to the foundation plate 28. For example, 25% of the pins may be of type 38a, and 75% of the pins of type 38b. This ratio of pin types is found to provide adequate attachment of the plates while reducing the number of fasteners that need to be installed and tightened. FIG. 2c shows another example pin 38c, wherein the nipple 46 is threaded to engage a threaded hole in either the distribution plate 28 or the foundation plate 36.

Figure 3:
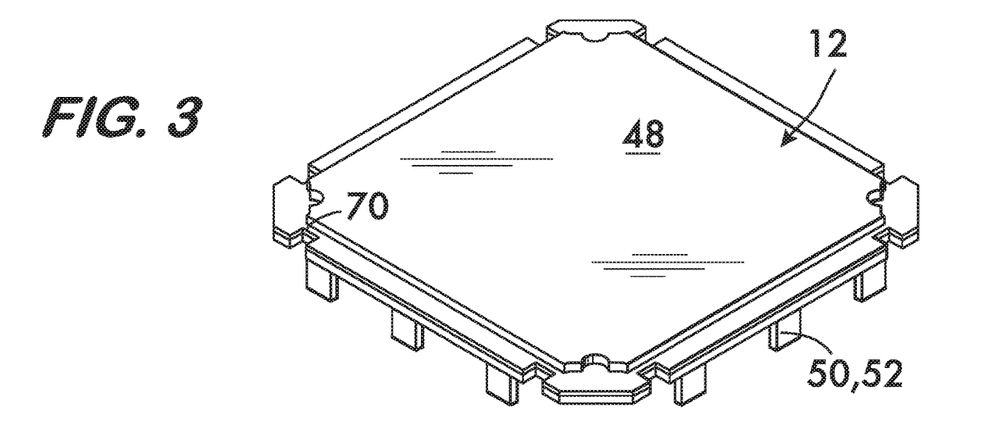
FIG. 3 is an isometric view of an example structural component of the flooring system shown in FIG. 1.
Figure 4:
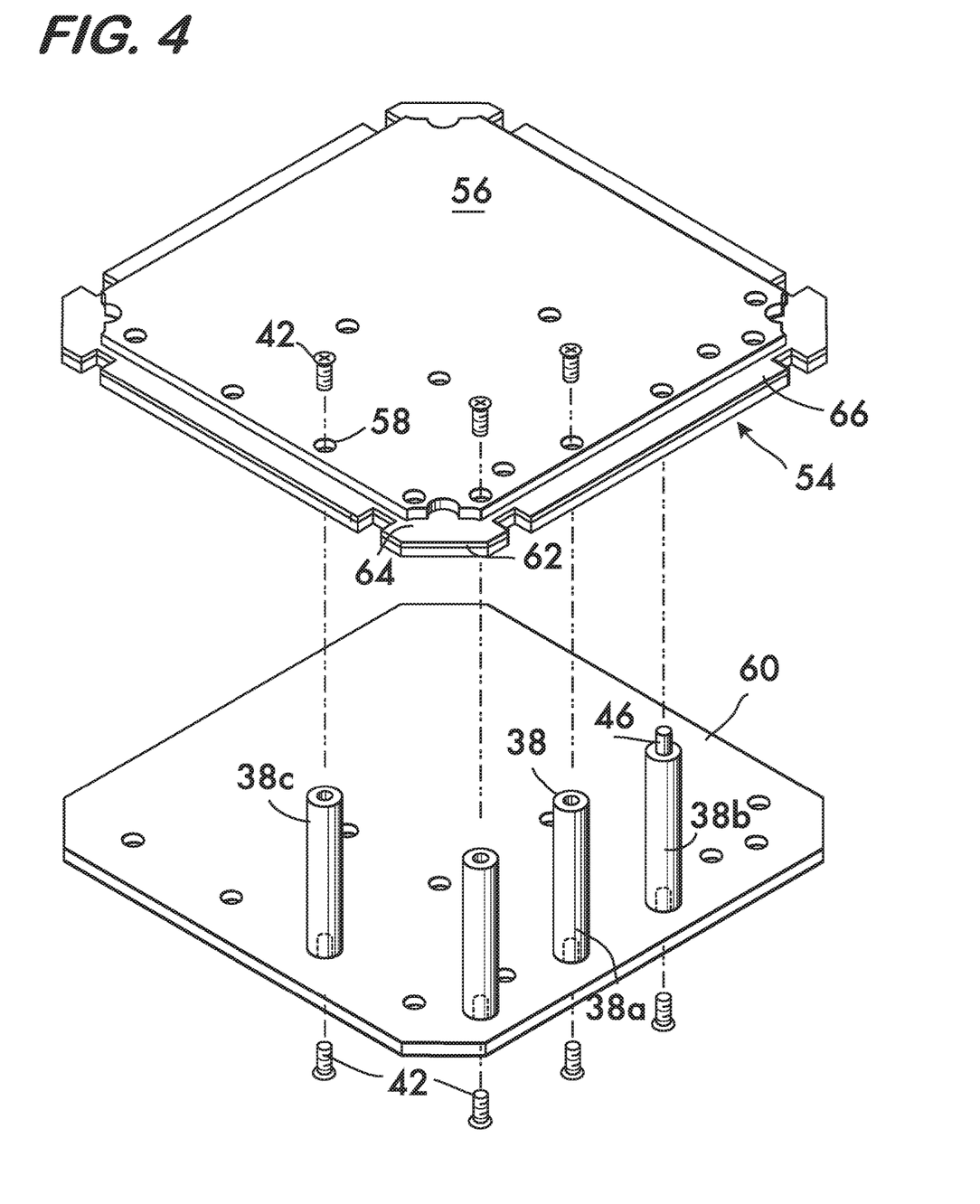
FIG. 4 is an exploded isometric view of an example structural component of the flooring system shown in FIG. 1.

FIG. 3 shows an example base unit 12, which comprises a base plate 48 supported on a plurality of support elements 50. In this example embodiment the support elements comprise tabs 52 which extend transversely to the base plate 48. FIG. 4 shows another example base unit 54. Base unit 54 comprises a base plate 56 having a plurality of support elements comprising pins 38 engaged with the base plate 56 and projecting transversely thereto. Various types of pins 38a, 38b and 38c as described above, may be used, either alone or in combination to support the base plate 56 on the floor surface 14. For example, fasteners 42 may be used to attach pins 38a to the base plate 56 through holes 58, nipples 46 of pins 38b may engage the holes 58, and/or the nipples may be threaded as in pin 38c to engage threaded holes in the base plate. Pins 38 are distributed in spaced apart relation across the base plate, for example on 3 inch to 5 inch centers to permit cables to pass through the pins.

Base unit 54 may further comprise a foundation plate 60 attached to the pins 38 in spaced relation to the baseplate 56. Fasteners 42 attach the pins 38 to the foundation plate 60, which rests on the floor surface 14 when the base unit 54 is installed. Base unit 54 may also comprise an under plate 62 underlying the base plate 56. Under plate 62 is larger in length and width than the base plate 56 and thus provides a support surface 64 which engages and supports the channel covers 20 and corner covers 22 at the same height above the floor surface 14 as the baseplate 56 (see FIG. 1). This provides smooth seams between the base units, the channel covers and the corner covers upon installation. It is further advantageous to include an electrically insulating substrate 66 between the under plate 62 and the base plate 56. The electrically insulating substrate 66 has approximately the same dimensions as the under plate 62 and electrically isolates the base plates 56, the channel covers 20 and the corner covers 22 from all of the components of the system 10. Substrate 66 may be made of nylon or other electrically insulating material.

Figure 5:
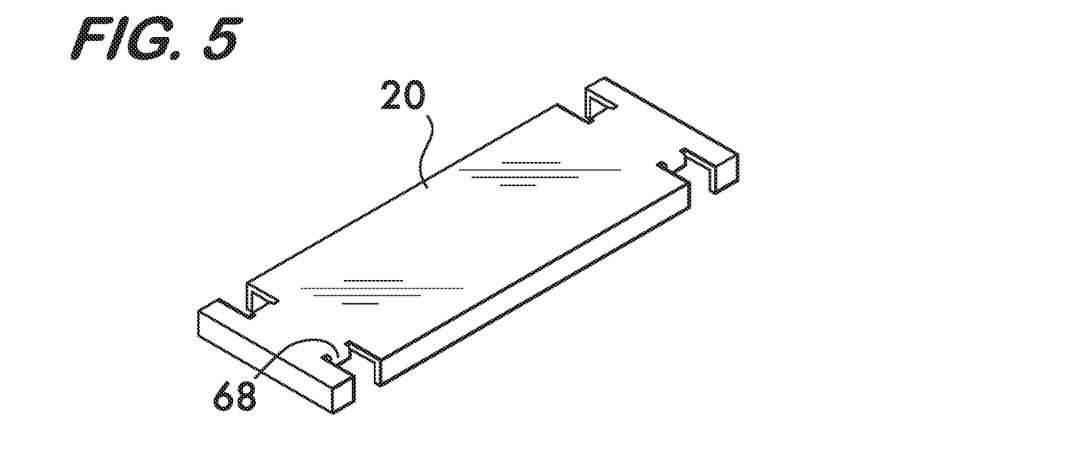
FIG. 5 is an isometric view of an example structural component of the flooring system shown in FIG. 1.
Figure 6:
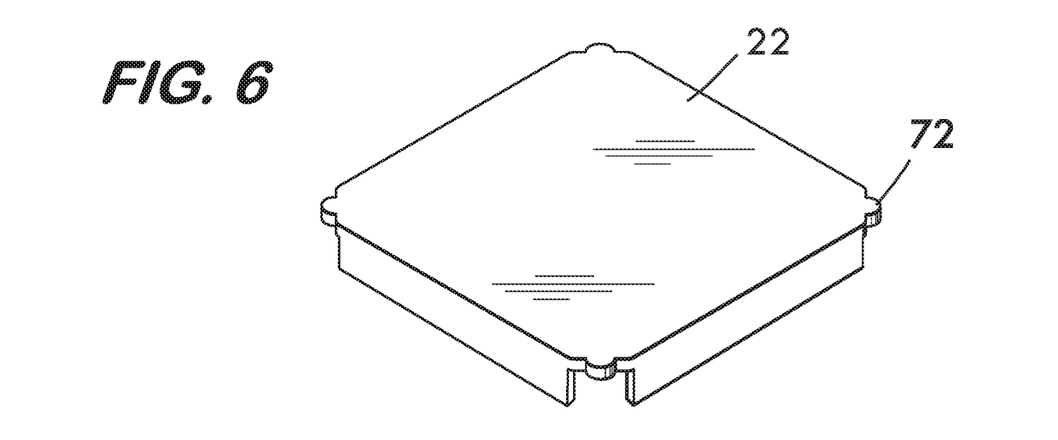
FIG. 6 is an isometric view of an example structural component of the flooring system shown in FIG. 1.

FIG. 5 shows, in detail, an example channel cover 20. Channel cover 20 comprises transversely extending tabs 68 which engage slots 70 in the under plate 62 of the base unit 54 and the base plate 12. FIG. 6 shows in detail an example corner cover 22 which has corner tabs 72 engageable with corners of the base units 54 and 12. Engagement of the channel covers 20, using the transverse tabs 68, and the corner covers 22, using corner tabs 72, with the base units 54 and 12 provide for a sturdy, interlocking attachment between the various components in the plane of the surface 26 (see FIG. 1), yet permit the channel covers 20 and the corner covers 22 to be easily removed to provide free access to the channels 16 defined by the base units 12 and 54 thereby allowing great freedom for cable routing, both during initial setup as well as for modifications to an existing layout.

Figures 7, 8, 9, 10:
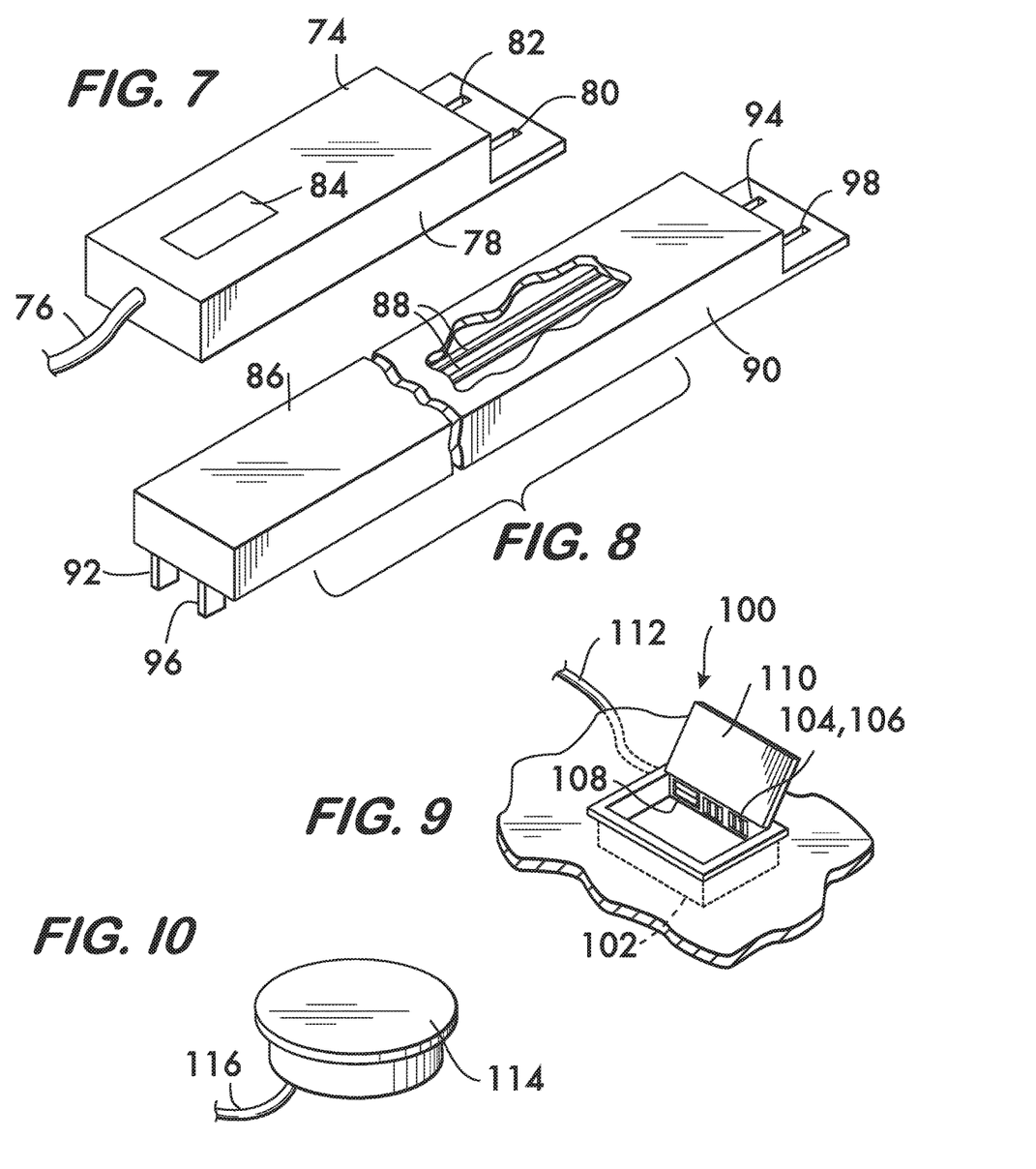
FIG. 7 is an isometric view of an example electrical component of the flooring system shown in FIG. 1.
FIG. 8 is an isometric view of an example electrical component of the flooring system shown in FIG. 1.
FIG. 9 is an isometric view of an example electrical component of the flooring system shown in FIG. 1.
FIG. 10 is an isometric view of an example radio frequency device used with the flooring system shown in FIG. 1.

FIG. 7 shows an electrical feed module 74 in detail. As shown in FIG. 1, the feed module is positionable within any of the channels 16 and provides electrical power to be distributed throughout the system 10. To that end, feed module 74 comprises a cable 76, for example, steel wire armored cable, which connects the feed module 74 to a source of electrical power. Cable 76 is connected to a box 78 which has one or more electrical contacts 80 electrically connected to the cable 76. In the example feed module 74 shown, the electrical contacts 80 comprise female slots 82 which receive contacts in the form of male blades (see below). A practical feed module 74 may be designed to carry up to 50 amps of current and provide 18 kWs of power. Each feed module 74 may also have its own fuse 84 to guard against short circuits.

Power provided by the feed modules 74 is distributed throughout the system 10 by bus bars 86. An example bus bar 86 comprises elongate electrical conductors 88 enclosed in a container 90. Conductors 88 are connected to first and second contacts 92, 94 at opposite ends of each bus bar 86. First contacts 92 comprise male blades 96 that can engage the female slots 82 of the feed modules 74. The first contacts 92 can also engage the second contacts 94 of another bus bar 86, which may comprise, for example, female slots 98 similar to those of the feed modules 74. Having compatible first and second contacts 92 and 94 at opposite ends allows the bus bars 86 to be strung together to deliver power from the feed modules 74 over significant distances (see FIG. 1). Practical bus bars 86 may be formed in lengths of 4 feet and 8 feet for adaptability to a particular design. Bus bars 86 and their associated feed modules 74 may be positioned on centers as great as 40 feet, for example, to distribute power throughout a system.

Figure 9A:
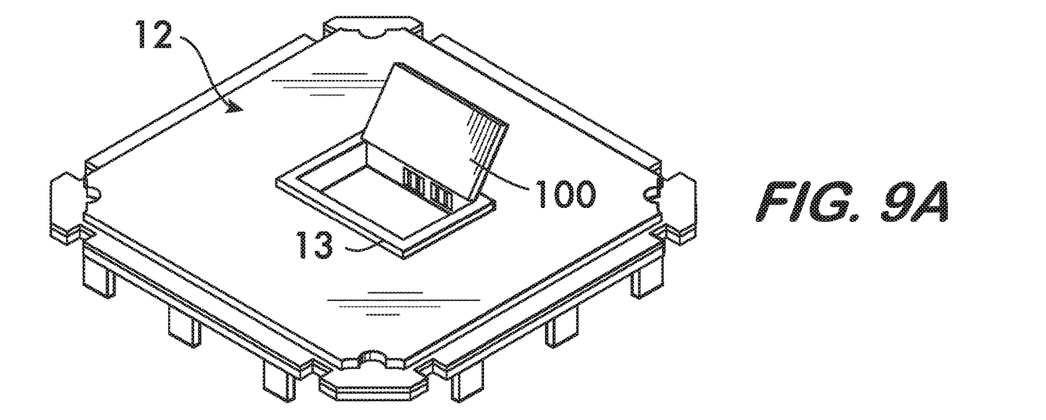
FIG. 9A is an isometric view of the example electrical component shown in FIG. 9 installed in a component of the flooring system shown in FIG. 1.

FIG. 9 shows an example embodiment of a terminal box 100. Terminal box 100 comprises a container 102 which houses one or more electrical contacts 104, such as standard female receptacles 106 for 110 volt AC power. Each receptacle 106 may be on a separate, fused line, the container 102 also housing the fuses 108, for example, circuit breakers. The container may have a lid 110, which may be hinged to the container as shown. This configuration is advantageous when the terminal box 100 is mounted on the floor surface 14, for example, within a base unit 12 positioned beneath a desk or table supported on the surface 26 of system 10 as shown in FIG. 1. As shown in FIG. 9A, the base unit 12 has a cut-out 13 adapted to receive the terminal box 100. In such an installation an electrical power cord 112 extends from the container 102 through channels 16 to connect to a bus bar 86 which supplies power to the receptacles 106. Alternately, the terminal box 100 can be mounted on the underside of the table or desk. In either configuration the terminal box supplies power to appliances, such as a computer, lights and the like at the desk.

Figure 10A:
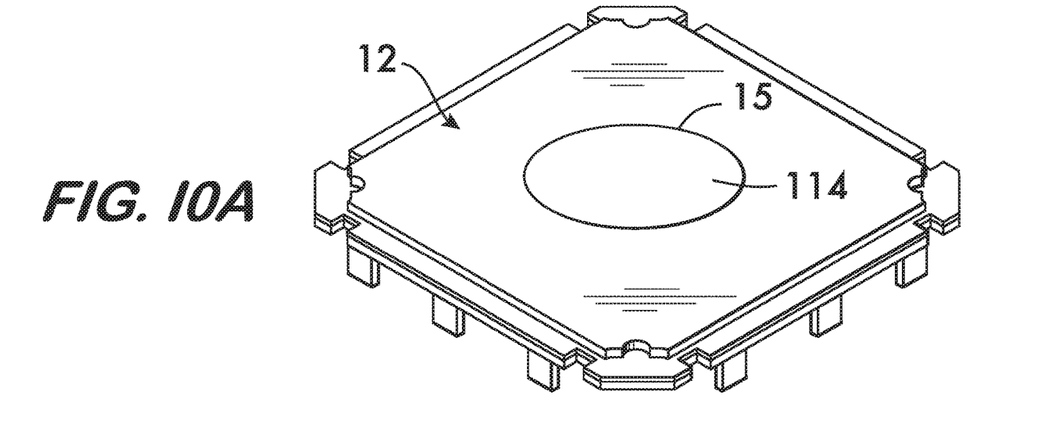
FIG. 10A is an isometric view of the example radio frequency device shown in FIG. 10 installed in a component of the flooring system shown in FIG. 1.

FIG. 10 shows a radio frequency (rf) device 114 which can be positioned throughout the system 10. For example, as shown in FIG. 1, device 114 may be mounted in a corner cover 22 as well as in a base unit 12 (see FIG. 10A) and also in a channel cover 20. Cut-outs 15 in the corner cover and base unit permit a flush mounting of the device with the surface 26 of the system 10. The rf device 114 may be for example, a motion sensor positioned at a work station which senses the absence of a person in its immediate vicinity and, after a predetermined time as elapsed, generates a first control signal which shuts off the appliances, such as lighting, at the work station. Upon detection of motion, the rf device 114 can generate and send a second control signal turning the appliances at the station on again. The control signals may be sent wirelessly or over wires 116 conducted through channels 16 to a control device, such as a programmable logic controller (not shown) which controls the distribution of electrical power throughout the system. In another embodiment, the rf device 114 may be a locator beacon which broadcasts a low power signal identifying the particular electrical line with which it is associated. The identifier signal may be received, for example, via an application on a cellular telephone and will allow technicians to positively locate specific electrical lines or other elements of the system and effect repairs or changes. It is envisioned that the rf device 114 may combine both functions of motion sensor and locator beacon.

Figure 11:
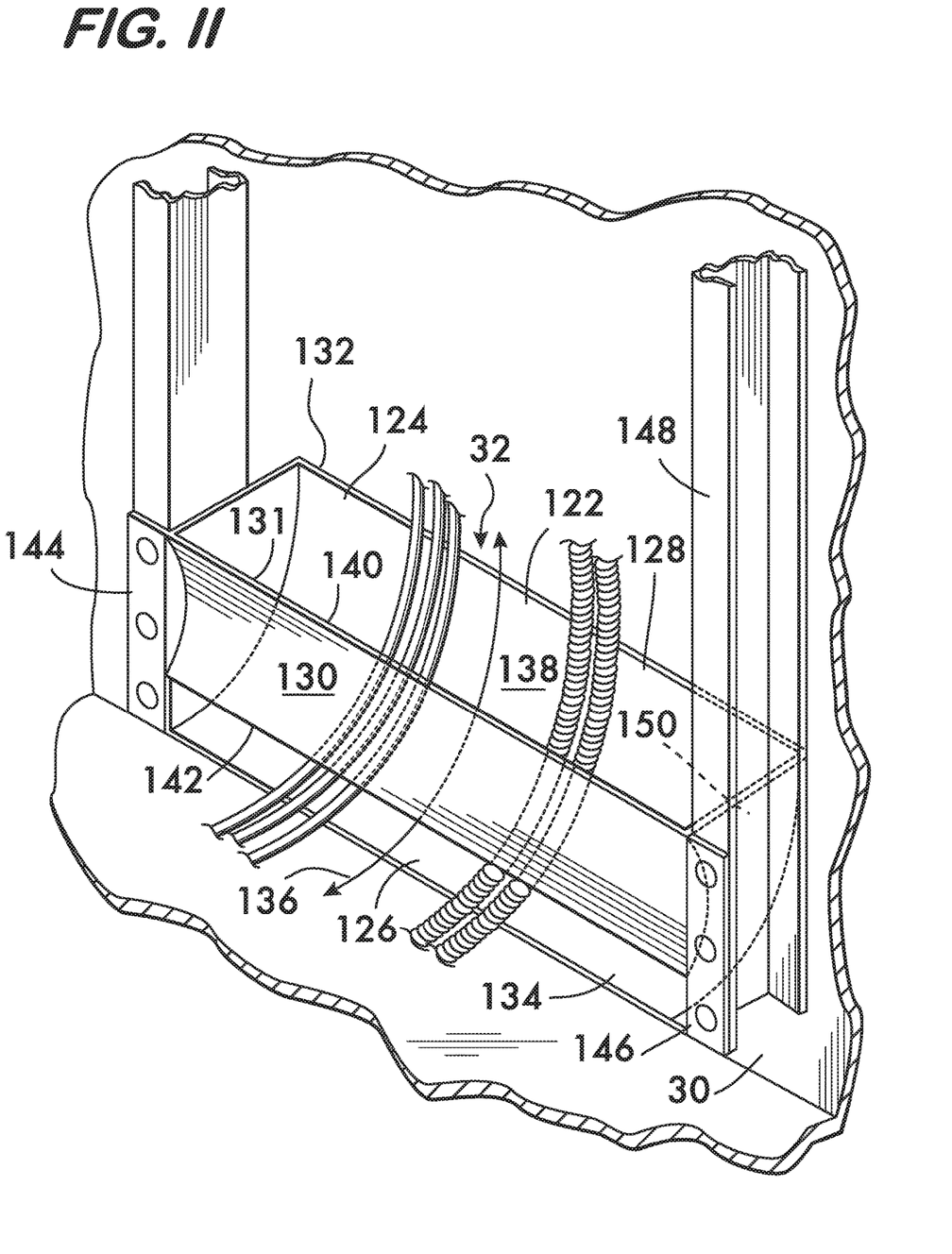
FIG. 11 is an isometric view of an example component of the flooring system shown in FIG. 1.

FIG. 11 shows a cable management boot 32. As shown in FIG. 1, boot 32 is used where a large number of cables enter the system 10, for example from another floor of the building or from an electrical or communications trunk room. Boot 32 is shown mounted within a building wall 30 and may be positioned at the top and/or bottom of the wall. As shown in FIG. 11, the boot comprises a duct 122 having an entrance opening 124 and an exit opening 126. Exit opening 126 is oriented transversely to the entrance opening 124. The openings 124 and 126 are defined by a back wall 128 and a front wall 130. Back wall 128 has a first edge 132 positioned at the entrance opening 124 and a second edge 134 positioned at the exit opening 126. The back wall 128 defines a path 136 between the entrance and exit openings 124 and 126 and may comprise, for example, a concave surface 138 facing the front wall 130. The back wall 128 manages the change in direction of the cables as they transition into the system 10. The front wall 130 has a first edge 140 positioned at the entrance opening to define the opening in conjunction with the first edge 132 of the back wall 128. The front wall 130 also has a second edge 142 positioned in spaced relation to the second edge 134 of the back wall 128 to define the exit opening 126. Front wall 130 may also comprise a convex surface 131 which faces the back wall 128. This shape allows cables to be readily and safely pulled though the boot 32. First and second flanges 144 and 146 may be attached to the front wall 130 to permit mounting of the boot 32 to studs 148 of the building wall 120. The flanges 144 and 146 extend outwardly from the boot's side walls 150. Sidewalls 150, which extend between the front and back walls 120, 128, may be positioned at opposite ends of the front and back walls to provide strength and rigidity to the duct 122. As shown in FIG. 1, boot 32 is advantageously used in conjunction with the distribution plate 28 which receives the large number of cables for distribution to the channels 16.

Access floor systems 10 permit rapid installation of a floor system, cabling and electrical power, as well as rapid modification of the system to meet changing demands of a workplace environment, such as where multiple work stations are located.

What is claimed is:

1. A floor system positionable on a floor surface, said system comprising:
   a plurality of base units positionable in spaced relation to one another on said floor surface thereby defining a plurality of channels therebetween, each said base unit comprising a base plate supported in spaced relation above said floor surface on a plurality of support elements, an under plate underlying at least one of said base plates, said under plate being larger than said at least one base plate, an electrically insulating substrate positioned between said under plate and said at least one base plate, said electrically insulating substrate having approximately the same dimensions as said under plate and electrically isolating said base plate from said under plate;

a plurality of channel covers positioned overlying said plurality of channels, said channel covers being supported by adjacent ones of said base units; and a plurality of corner covers overlying a space formed where at least two of said channels intersect one another, said corner covers being supported by adjacent ones of said base units;

at least one feed module positioned in at least one of said channels beneath at least one of said channel covers, said at least one feed module comprising:

a cable connectable to a source of electrical power;

a first set of contacts electrically connected to said cable;

a second set of contacts electrically connected to said first set of contacts;

a container enclosing said first set of contacts, said container sized to fit within said at least one channel and beneath said at least one channel cover.

2. A floor system positionable on a floor surface, said system comprising:

a plurality of base units positionable in spaced relation to one another on said floor surface thereby defining a plurality of channels therebetween, each said base unit comprising a base plate supported in spaced relation above said floor surface on a plurality of support elements, an under plate underlying at least one of said base plates, said under plate being larger than said at least one base plate, an electrically insulating substrate positioned between said under plate and said at least one base plate, said electrically insulating substrate having approximately the same dimensions as said under plate and electrically isolating said base plate from said under plate;

a plurality of channel covers positioned overlying said plurality of channels, said channel covers being supported by adjacent ones of said base units; and a plurality of corner covers overlying a space formed where at least two of said channels intersect one another, said corner covers being supported by adjacent ones of said base units;

at least one bus bar positioned in at least one of said channels beneath at least one of said channel covers, said at least one bus bar comprising:

at least two elongate electrical conductors;

at least a first and a second set of contacts electrically connected to said elongate electrical conductors;

a container enclosing said elongate electrical conductors and said first and second sets of contacts, said container sized to fit within said at least one channel and beneath said at least one channel cover.

3. A floor system positionable on a floor surface, said system comprising:

a plurality of base units positionable in spaced relation to one another on said floor surface thereby defining a plurality of channels therebetween, each said base unit comprising a base plate supported in spaced relation above said floor surface on a plurality of support elements, an under plate underlying at least one of said base plates, said under plate being larger than said at least one base plate, an electrically insulating substrate positioned between said under plate and said at least one base plate, said electrically insulating substrate having approximately the same dimensions as said under plate and electrically isolating said base plate from said under plate;

a plurality of channel covers positioned overlying said plurality of channels, said channel covers being supported by adjacent ones of said base units; and a plurality of corner covers overlying a space formed where at least two of said channels intersect one another, said corner covers being supported by adjacent ones of said base units;

at least one radio frequency transmitter positioned within one of said base units.

4. The floor system according to claim 3, wherein said radio frequency transmitter comprises a motion sensor.

5. The floor system according to claim 3, wherein said radio frequency transmitter comprises an identification beacon.

6. The floor system according to claim 3, wherein said radio frequency transmitter comprises a combination motion sensor and identification beacon.

* * * * *